United States Patent
Melekhova et al.

(10) Patent No.: US 9,910,768 B1
(45) Date of Patent: Mar. 6, 2018

(54) METHOD FOR MEMORY MANAGEMENT FOR VIRTUAL MACHINES

(71) Applicant: Parallels IP Holdings GmbH, Schaffhausen (CH)

(72) Inventors: Anna L. Melekhova, Moscow (RU); Larisa Markeeva, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 99 days.

(21) Appl. No.: 15/161,475

(22) Filed: May 23, 2016

(51) Int. Cl.
*G06F 12/02* (2006.01)
*G06F 12/08* (2016.01)
*G06F 9/50* (2006.01)

(52) U.S. Cl.
CPC .......... *G06F 12/023* (2013.01); *G06F 9/5016* (2013.01); *G06F 12/08* (2013.01)

(58) Field of Classification Search
CPC ....... G06F 12/023; G06F 12/08; G06F 9/5016
See application file for complete search history.

(56) References Cited

U.S. PATENT DOCUMENTS

| | | | | |
|---|---|---|---|---|
| 2011/0283277 A1* | 11/2011 | Castillo | ................. | G06F 9/5077 718/1 |
| 2011/0314247 A1* | 12/2011 | Choi | ................. | H04N 5/44 711/170 |
| 2012/0221765 A1* | 8/2012 | Yoo | ................. | G06F 12/023 711/6 |
| 2012/0290765 A1* | 11/2012 | Durrant | ................. | G06F 12/023 711/6 |
| 2013/0325912 A1* | 12/2013 | Corrie | ................. | G06F 12/0253 707/813 |
| 2014/0108765 A1* | 4/2014 | Li | ................. | G06F 12/02 711/171 |
| 2014/0143516 A1* | 5/2014 | Dawson | ................. | G06F 12/0253 711/171 |
| 2015/0161056 A1* | 6/2015 | Deguillard | ................. | G06F 9/455 711/6 |
| 2015/0254000 A1* | 9/2015 | Sivathanu | ................. | G06F 12/0868 711/103 |

* cited by examiner

*Primary Examiner* — Ryan Bertram
(74) *Attorney, Agent, or Firm* — Bardmesser Law Group

(57) ABSTRACT

A method and system for management of physical memory of Virtual Machines (VMs) using dynamic memory reallocation based on estimated usages by each of the VMs is provided. A host has different VMs with respective Guest OSs running on the host OS. The Guest OS of an exemplary VM has a balloon agent driver running on it. The balloon agent driver collects Guest OS statistics and calculates Working Set Size (WSS) of the Guest OS based on the Guest OS statistics. The WSS is provided to a Hypervisor via a Virtual Machine Monitor (VMM). The Hypervisor adjusts the size of the ballooned memory based on the calculated WSS and the virtualization statistics collected by the Hypervisor using the VMM.

15 Claims, 3 Drawing Sheets

METHOD FOR MEMORY MANAGEMENT FOR VIRTUAL MACHINES

BACKGROUND OF THE INVENTION

Field of the Invention

This invention relates to a method for memory management, and more particularly, to management of physical memory of Virtual Machines (VMs).

Description of the Related Art

A modern trend of virtualization presents some challenges with regard to allocation and management of physical memory for Virtual Machines (VMs).

VM—Virtual Machine, a type of isolated Virtual Execution Environments running on the same physical machine simultaneously. Each Virtual Machine instance executes its own Guest OS kernel. Support of Virtual Machines is implemented using a Virtual Machine Monitor and/or a Hypervisor. The VMs can be classified based on the abstraction level as application-level VMs, OS-level VMs and hardware-level VMs. The memory management of the hardware-level VMs presents some problems with assigning and allocation of correct amount of physical memory for each VM. Insufficient memory generates many page faults, while extra memory causes resources overuse.

The VM is implemented under a host OS, which has direct access to system hardware. The host OS controls physical memory used by the VM's Guest applications by translating virtual memory pages into physical pages either by controlling guest paging (that is, translation of virtual addresses into physical addresses) or by filling a special hardware translation table from guest physical addresses into host physical addresses. However, the VM processes (i.e., Guest applications and configuration services) have some special requirements when it comes to working with the host OS physical memory. A configured amount of physical memory is mounted to a Guest OS for consumption by the Guest applications (when the user sets up the VM initially). When the Guest OS is launched on the VM, the Guest OS "sees" this amount of the physical memory as installed RAM. However, the actual amount of the physical memory allocated to the VM can be significantly smaller.

A Hypervisor is responsible for translation of the installed to the VM memory to the pages of the physical memory. In other words, the issue is a correct translation from guest physical addresses into host physical addresses. A memory allocated to the guest OS could be referenced as an available memory. A memory configured for the VM (and, thus, visible for the guest OS as installed) is known as assigned memory. A virtual memory is memory visible inside a process/application (within guest/host OS) and maintained through the paging.

The Hypervisor works with memory pages allocated from the host OS using their physical addresses. Since the host OS cannot reallocate VM pages, the Hypervisor, as an option, allocates pool of available pages among the VMs running under the same host OS. It can also be done by another management component running on the host OS side. The Guest OS of a particular VM often does not need the entire assigned/configured memory. Thus, some extra unused memory can be given (re-allocated) to other VMs. However, conventional Hypervisors cannot estimate the memory use by the VM.

One problem is sometimes known as "overcommit"—i.e., when a total amount of assigned RAM for all VMs on the host exceeds the amount of physical RAM on the host. This requires a fair distribution of memory among the VMs, to avoid a large number of virtualization page faults, and can be addressed by reallocation of additional memory to this VM. A memory ballooning can be used for increasing/reducing the allocated memory. Typically, a balloon size is based on some approximation from an aggregated load on the host system produced by all the VMs and their Guest applications. In this case, the balloon size is changed proportionally for all of the VMs. This is inefficient, because some VMs still get extra memory amounts and some get insufficient memory amounts. However, in conventional Hypervisors, the size of the balloon cannot be dynamically and precisely reduced or increased based on the estimated memory usage by a particular VM.

Accordingly, a method for automated VM memory reallocation based on estimated usage for VMs is desired.

SUMMARY OF THE INVENTION

Accordingly, the present invention is directed to a method for management and automated reallocation of physical memory of Virtual Machines (VMs) that substantially obviates one or more of the disadvantages of the related art.

In one aspect of the invention, a method and system for management of physical memory of Virtual Machines (VMs) using dynamic memory reallocation based on estimated usages by each of the VMs is provided. A Guest OS of each VM is monitored using different counters. Different VMs with respective Guest OSs are running under the host OS. The Guest OS of an exemplary VM has a balloon agent driver running on it. The balloon agent driver collects Guest OS (i.e., Guest applications execution) statistics and calculates a Working Set Size (WSS) of the Guest OS based on the Guest OS statistics taking into consideration the Guest applications consuming portions of the guaranteed assigned physical memory. The WSS is provided to a Hypervisor via a Virtual Machine Monitor (VMM).

The Hypervisor adjusts the size of the ballooned memory based on the calculated WSS and the virtualization statistics collected by the Hypervisor using the VMM. The Hypervisor (or any agent on the host side) can correct the size of the ballooned memory approximately once per second or less often. If the balloon size changes, the Guest balloon agent is informed about it by the Hypervisor. The Hypervisor processes the data reflecting the balloon size changes and the Hypervisor uses this data for reallocation of memory among the VMs' Guest OSs. Thus, memory allocation is dynamically controlled on-the-fly.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incor- In the drawings.

DETAILED DESCRIPTION OF THE PREFERRED EMBODIMENTS

Figure 1:
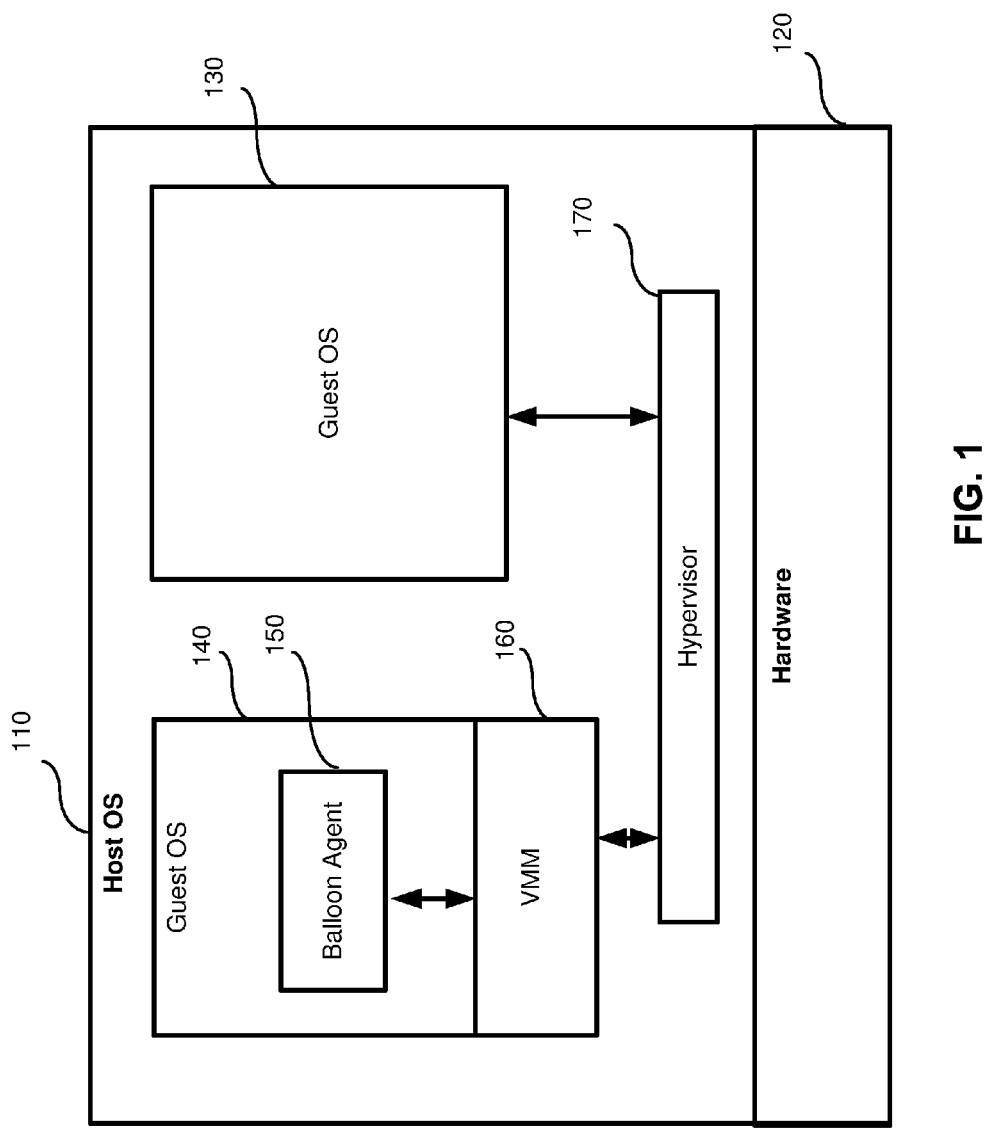
FIG. 1 illustrates an exemplary host system with VMs running on it.

Reference will now be made in detail to the preferred embodiments of the present invention, examples of which are illustrated in the accompanying drawings.

The present invention is directed to a method for management of physical memory allocation to the VM using ballooning. The following definitions are used throughout the description.

A method and system for management of physical memory of Virtual Machines (VMs) using dynamic memory reallocation based on estimated usages by each of the VMs is provided. A Guest OS of each VM is monitored using different counters. Some VMs may have extra memory allocation and some may have insufficient memory. In one embodiment, a memory ballooning approach is used to solve this issue. The ballooning technology marks missing virtual memory pages as being in exclusive (allocated) use—i.e., it creates dummy memory occupation. A special ballooning agent driver runs on the Guest OS, which receives physical memory pages for exclusive use by employing Guest OS APIs. The ballooning driver provides the allocated pages addresses to the Hypervisor so it can take the unused pages. Note that memory reallocation can be performed by a special management component on a host side instead of a Hypervisor.

Thus, from the point of view of the Guest OS the pages are occupied (by a consumer on a Guest OS side—the balloon agent), while, in fact, they are given to another memory user. The memory ballooning is very efficient, because it guarantees that there are no calls to the reallocated pages. Thus, the memory balloon can be "inflated" by pushing the physical pages from the Guest OS by the ballooning agent. Likewise, the memory balloon can be "deflated" by returning the physical pages to the Guest OS from the ballooning agent.

According to the exemplary embodiment, the size of the ballooned memory is controlled based on collected Guest OS statistics (i.e., Guest applications' execution statistics) and on collected virtualization statistics. A Guest OS of each VM is monitored using different counters. The memory ballooning technique can create a problem when remaining system pages (not freed up by memory ballooning) experience overloads. According to the exemplary embodiment, this problem is solved by correct estimation of a Working Set Size (WSS). Once the estimation is performed, the balloon size can be adjusted, which would reduce Guest OS productivity losses due to page overloads. The WSS is a subset of physical memory pages that have been accessed over a certain time period. For example, a memory of a service process, which executes once in 10 minutes, will not be included into the WSS if it is measured based on the last minute. Launch of a new process will change the WSS by adding new pages to it.

According to the exemplary embodiment, a Guest OS of each VM is monitored using different counters. Two types of counters are used—Guest counters and virtualization counters. The Guest counters collect statistical data used by the Guest OS for configuration and Guest applications' needs. The virtualization counters register and categorize virtualization events (i.e., privileged operations of the Guest OS) performed by the Hypervisor. Statistics collected by each type of the counters are different.

The Guest counters provide reliable data on aggregated amount of the processes' virtual memory and on locked memory (i.e., memory belonging to a particular process and not subjected to reallocation). However, the Guest counters do not always provide an accurate account of the page faults. The page faults are important in terms of reflecting the system state. According to the exemplary embodiment, the page faults can be detected in the Hypervisor using a Virtual Machine Monitor (VMM). The Guest OS cannot provide statistics on a number of page virtualization faults, reflecting how often an access to a guest page generates a call to the Hypervisor for allocating a new memory page. Therefore, the virtualization statistics need to be used as well.

In one exemplary embodiment, only the statistics from the Guest counters are used. Alternatively, both the Guest counters' statistics and the virtualization counters' statistics can be used. According to the exemplary embodiment, the following counters (parameters) are used in WINDOWS™ OS:

Commit total—a number of pages of allocated physical memory;

Resident Available—a number of pages

Physical memory usage—an amount of physical memory used; and

Page file usage—an amount of page files used.

There are various ways to calculate WSS, based on, for example, counters such as commit total, resident available pages, cache bytes, and so on. Such an approach can be used with any operating system, e.g., WINDOWS, or similar counters in other operating systems, such as LINUX. An empirical estimate of the WSS for WINDOWS can be calculated, for example, as:

$$WSS=CommitTotal-BalloonSize,$$

where the BalloonSize is a size of the ballooned memory.

However, research shows that this estimation is not precise and needs to be corrected by the size of the caches of the OS as follows:

$$WSS=CommitTotal-BalloonSize+\sigma^*PhysicalTotal$$

Where $\sigma$ is an empirical coefficient selected using the PCMark test.

While the above correction improves the productivity of the system, the productivity falls significantly when high disk loads are present. According to the exemplary embodiment, this problem is addressed by estimation using a method of reinforcement learning where the fine is determined based on virtualization counters. The main idea of this method is to adjust the size of the ballooned memory as follows:

$$BalloonSize=PhysicalTotal-WSS-gap$$

where the WSS for the balloon is calculated above;

the PhysicalTotal is an allocated memory amount of the Guest OS;

gap—is a special value intended to compensate WSS estimation error. We assume that since WSS is a synthetic value, its estimation has some error.

Note that overestimation of the balloon size is more harmful than underestimation. If the balloon size is overestimated, a sharp drop in Guest OS productivity can occur. If the balloon size is underestimated, a proportional decrease in the saved resource (i.e., a decrease in density of location of virtual environments) occurs. According to the exemplary embodiment, the gap is used to prevent from the overestimation of the balloon size. The following factors are used for the gap generation:

1. Deviation in size of the ballooned physical memory has a negative impact on the system productivity. The balloon size needs to be kept the same, until the benefit of the alternative gap does not exceed the productivity loss caused by the change of the balloon size.

2. The gap size and the rate of its change should not go beyond certain values. Otherwise, system maintenance costs become too high.

3. Increase in a number of virtualization page faults and IO operations can serve as indications of ineffectiveness of the current gap.

According to the exemplary embodiment, the following formula can be used for a fine calculation for gap changes:

$$fine = \Delta io - io\_thres * io\_fine + \Delta pgin - pgin\_thres * pgin\_fine$$

where:

$\Delta io$, $\Delta pgin$—are changes in a number of IO operations and changes in a number of the virtualization page faults over an estimation time period.

io_thres, pgin_thres—is a threshold value reflecting an acceptable level of increase of a number of the IO operations and a number of virtualization page faults.

io_fine, pgin_fine—a fine for the gap increase and the reward for the gap decrease. According to the exemplary embodiment, the fine corrects the WSS estimation based on the virtualization (VMM) statistics. The fine is calculated in Mb. For example, if the Guest OS reports WSS=512 Mb, Guest OS=1024 Mb, the balloon would be around 400 Mb. However, in the case of intensive IO, the balloon should be deflated for the Guest OS to be able to extend its caches.

The method of reinforcement learning provides for selection of the best gap value increase in (100–E) cases. In (E) cases the gap increase is selected arbitrarily. An algorithm for automated selection of the gap is provided in Appendix i.

This algorithm depends on "degree of greediness" E (i.e., greedy_degree in the code). The larger is E, the faster is the algorithm being taught, but the lower its productivity during learning. According to the exemplary embodiment, the value of E is selected over a set of the following tests:

busy loop;
disk activity tests;
tests for switching processes/threads;
network activity tests;
memory usage tests;
installation of MS Office™;
simulations of working with the MICROSOFT Office™ applications;
3-D graphics tests; and
PCMark.

FIG. 1 illustrates an exemplary host system with VMs running on it. A host 110 has hardware 120 and a host OS. VMs with respective Guest OSs 130 and 140 are running on the host OS. The Guest OS 140 has a balloon agent driver 150 running on it. The balloon agent driver 150 collects Guest statistics and calculates WSS of the Guest OS 140 based on the Guest statistics. The WSS is provided to a Hypervisor 170 via a Virtual Machine Monitor (VMM) 160 using virtualization interface VirtIO (not shown). The WSS can be calculated either on the balloon agent driver 150 side or in the Hypervisor 170 based on the Guest statistics passed to the Hypervisor as parameters.

The Hypervisor 170 adjusts the size of the ballooned memory based on the calculated WSS and the virtualization statistics collected by the Hypervisor. According to the exemplary embodiment, the Hypervisor corrects the size of the ballooned memory approximately once per second. Note that a longer time interval for correction can be used. If the balloon size changes, the Guest balloon agent 150 is informed about it by the Hypervisor 170 via VirtIO interface. The Hypervisor 150 processes the data reflecting the balloon size changes and the Hypervisor 150 uses this data for reallocation of memory among the VMs' Guest OSs 130 and 140. Thus, memory allocation is, advantageously, controlled on-the-fly.

Figure 2:
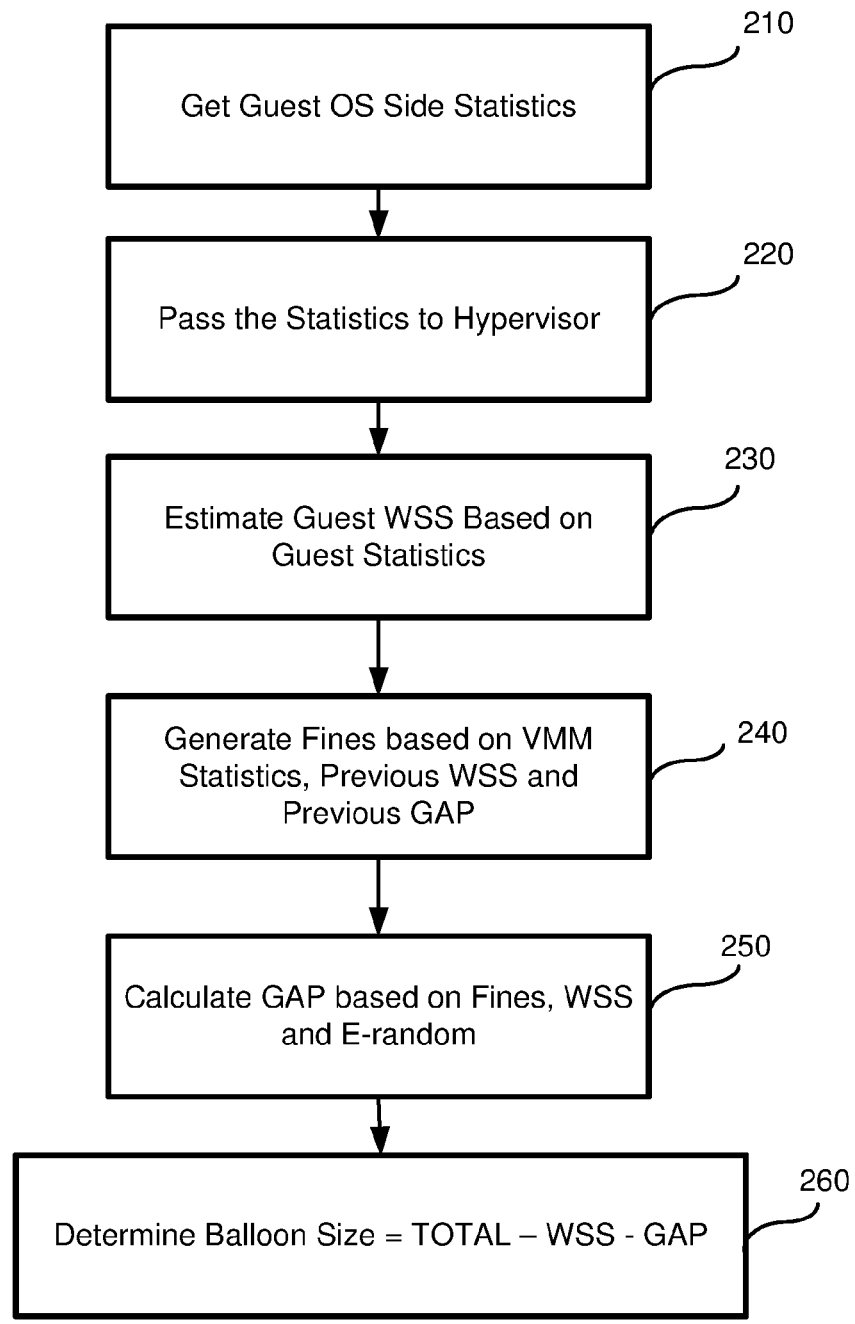
FIG. 2 illustrates a flowchart of the memory management method is accordance with the exemplary embodiment.

FIG. 2 illustrates a flowchart of the memory management method is accordance with the exemplary embodiment. In step 210, the process collects Guest OS statistics. In step 220, the Guest OS statistics are passed to a Hypervisor. Guest VSS is estimated based on the Guest statistics in step 340. In step 250, the process generates fines based on the virtualization (VMM) statistics, previous WSS and a previous gap. In step 260, the process calculates gap based on fines, WSS and E-random (degree of greediness). Then, the process determines the balloon size as:

$$BalloonSize = CommitTotal - WSS - gap,$$

where CommitTotal is a number of pages of allocated physical memory.

Note that while using the reinforcement learning, it is important to find a compromise between learning and profits. At one point the algorithm stops the learning process in order to provide for more profits. However, in the exemplary embodiment, the life span of the VM is sufficiently short and slow, but continuous leaning is provided. Note that CommitTotal is a WINDOWS OS term. However the same approach can be applied for other Guest OSs having a value of a number of pages of allocated physical memory.

According to the exemplary embodiment, the Hypervisor reallocates memory between the VMs by "inflating" a balloon for one VM and "deflating" a balloon for another VM. The Hypervisor sends an interrupt to the balloon driver. The balloon driver detects the interrupt and processes a new request from the Hypervisor to either deallocate pages from the VM or allocate pages to the VM. Subsequently, a translation table from Guest addresses to host physical addresses changes when the balloon size changes.

As discussed above, a series of micro-tests and macro-tests are performed on VM Guest OS in order to determine a percentage of memory use as compared to the allocated to the VM physical memory size. First iteration of the micro-test includes execution of the micro-test 10000 times (for example). First iteration of the macro-test includes execution of the macro-test from 10 to 100 times (depending on the nature of the test). First launch of the test set includes execution 5-10 iterations (for example) of each of the macro and micro-tests and a pause between the iterations and an increased pause between the different tests.

An iteration of each test produces a certain score. The test scores depends on the nature of the test—e.g., a number of micro-tests executed over a time period, a score of the 3D test, a number of processed events, etc. The test score is presented as a pair—an average score across the iterations and a standard deviation. Examples of the micro-tests are:

empty requests to OS kernel, instantiation and termination of processes, beginning and ending of threads, synchronization of threads over a socket, memory allocation through Virtalloc component, allocation and reading of memory, allocation and writing to memory, random and sequential reading from file, copying of data between two memory areas, dividing by zero, writing into a mapped file, operations with the registry, message exchanges between processes, creation of embedded directories and their bypass, sequential and page-by-page writes into a file, rectangle rendering, and launching MICROSOFT EXCEL™ with different files.

According to the exemplary embodiment, the examples of the macro-tests are: project compilation, decoding a file from MPG to WMV, Cinebench rendering test, execution of Java Volano test, and installation MICROSOFT OFFICE™ and opening an application with a subsequent un-installation of the MICROSOFT OFFICE™.

Figure 3:
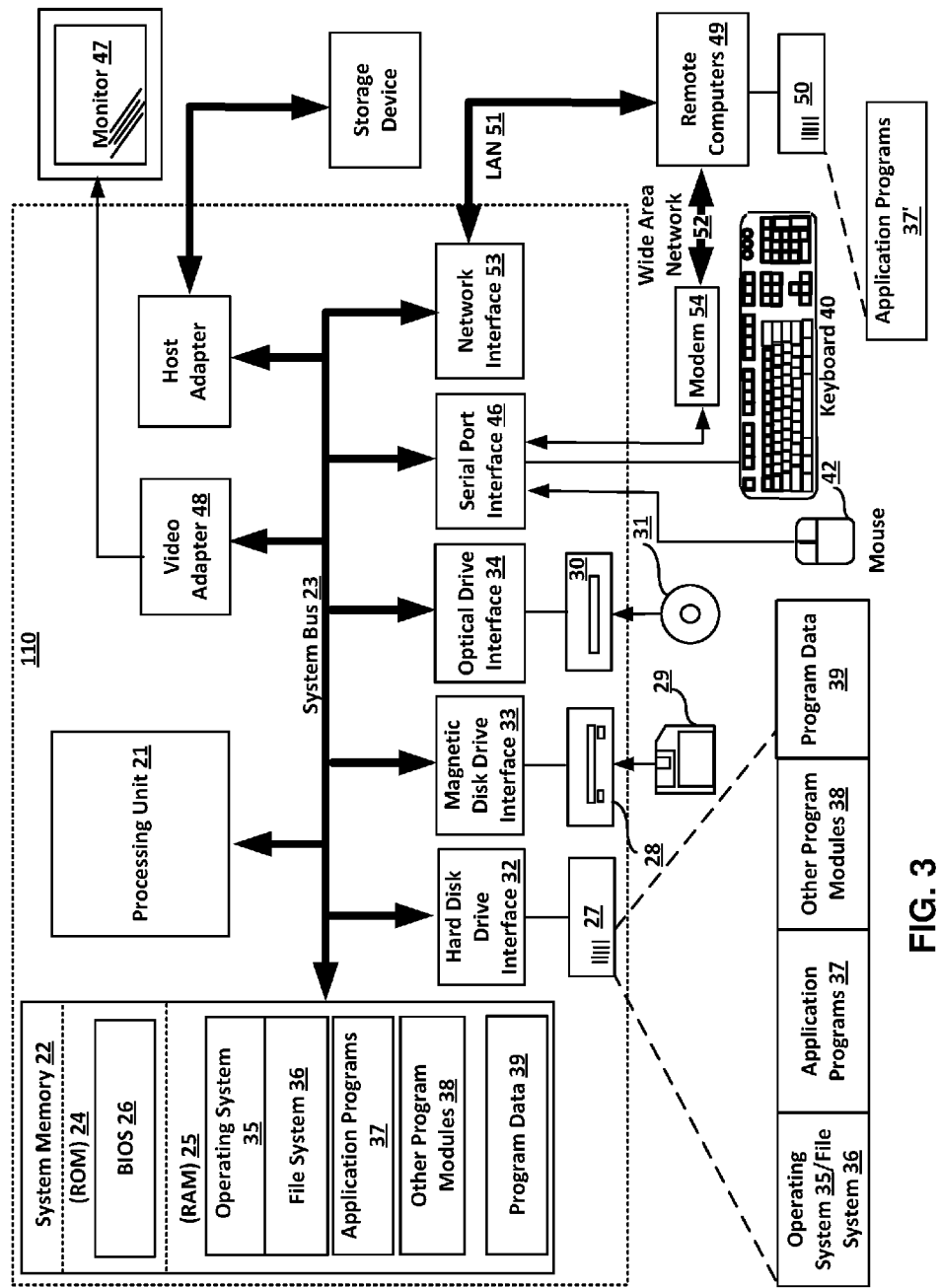
FIG. 3 illustrates a schematic of an exemplary host computer system that can be used for implementation of the invention.

With reference to FIG. 3, an exemplary host system for implementing the invention includes a general purpose computing device in the form of a host computer system 110 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 110, such as during start-up, is stored in ROM 24.

The computer 110 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 110.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 110 includes a file system 36 associated with or included within the operating system 35, one or more application programs 37, other program modules 38 and program data 39. A user may enter commands and information into the computer 110 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 110 may operate in a networked environment using logical connections to one or more remote computers 49. The remote computer (or computers) 49 may be another computer, a server, a router, a network PC, a peer device or other common network node, and typically includes many or all of the elements described above relative to the computer 110, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 110 is connected to the local network 51 through a network interface or adapter 53. When used in a WAN networking environment, the computer 110 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 110, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

APPENDIX I (1) gap_chng[GAP_TO_IDX(prev_gap_change)]=fine( );
(2) if(greedy_degree && (++iter) % greedy_degree==0)
(3) gap=ALIGN_GAP(gap+rand64( ) %GAP_CHANGE_MAX);
(4) else
(5) {
(6) gap=ALIGN_GAP(ws−prev_ws+prev_gap);
(7) gap_change=gap—prev_gap;
(8) tgt_i=GAP_TO_IDX(gap_change); //target index
(9) for(i=0; i<GAP_CHANGE_ARRAY; i++)
(10)   if(gap_chng[i]−gap_chng[tgt_i]>gap_chng_threshold)
(11) tgt_i=i;
(12) if(tgt_i !=GAP_TO_IDX(gap_change))
(13) gap=ALIGN_GAP(prev_gap+gap_chng[tgt_i]);
(14) }
(15) prev_gap_change=prev_gap−gap;
(16) prev_gap=gap;
(17) prev_ws=ws;

What is claimed is:

1. A computer-implemented system for managing physical memory assigned to Virtual Machine (VM), the system comprising:
    a host having a host OS and a physical memory;
    at least one Virtual Machine (VM) running on the host OS;
    at least one Guest application running on a Guest OS of the VM and consuming physical memory allocated to the VM;
    a balloon agent running on the Guest OS of the VM configured to collect Guest statistics and to calculate a Working Set Size (WSS) based on the Guest statistics,
    wherein the balloon agent designates at least some memory as being associated with a fake Guest application that the VM treats as an allocated memory; and
    a Hypervisor configured to receive the WSS via a Virtual Machine Monitor (VMM) and to collect virtualization statistics,
    wherein the Hypervisor adjusts a size of a ballooned memory and reallocates memory to the VM, and
    wherein the size of the balloon memory is adjusted as:

BalloonSize=PhysicalTotal−WSS−gap where PhysicalTotal is an allocated memory amount of the Guest OS and gap is a value that compensates for WSS estimation error based on machine learning.

2. The system of claim 1, wherein the WSS is calculated in the Hypervisor based on the Guest statistics passed to the Hypervisor as parameters.

3. The system of claim 1, wherein the Guest statistics reflect Guest application execution statistics for memory consumption.

4. The system of claim 1, wherein the balloon communicates with the Hypervisor via a VirtIO interface.

5. The system of claim 1, wherein a host-side component adjusts the size of the balloon memory.

6. The system of claim 1, wherein the Hypervisor changes a translation table from Guest addresses to host physical addresses upon adjustment of the size of the balloon memory.

7. A computer-implemented method for managing physical memory allocated to Virtual Machine (VM), the method comprising:
    launching at least one VM on a host;
    assigning physical memory to the VM;
    activating at least one Guest application consuming a portion of the assigned physical memory on a Guest OS of the VM;
    instantiating a balloon agent on a Guest OS of the VM;
    collecting Guest OS statistics by the balloon agent;
    providing the Guest OS statistics to a Hypervisor;
    calculating Guest working set size (WSS) based on the Guest statistics;
    collecting virtualization statistics;
    generating fines based on the virtualization statistics, WSS and a gap value;
    calculating a current gap value based on fines, WSS and a degree of greediness;
    determining a balloon size by subtracting the WSS and the current gap from a total number of pages of physical memory allocated to the VM; and
    reallocating memory to the VM based on the balloon size, and
    wherein the balloon agent adds or subtracts from the physical memory assigned to the VM by adding or subtracting from the physical memory allocated to the VM.

8. The method of claim 7, further comprising adjusting a translation table from Guest addresses to host physical addresses upon addition or subtraction from the physical memory allocated to the VM.

9. The method of claim 7, further comprising employing reinforcement, learning technique for the determining of the balloon size.

10. The method of claim 7, wherein the collecting of the Guest and virtualization statistics comprises performing macro-tests and micro-tests.

11. The method of claim 10, wherein the macro-tests are any of:
    project compilation;
    decoding a file from MPG to WMV;
    Cinebench rendering test;
    Java Volano test; and
    installation of MICROSOFT OFFICE™ and opening an application with a subsequent un-installation of the MICROSOFT OFFICE™.

12. The method of claim 10, wherein the micro-tests are any of:
    empty requests to OS kernel;
    instantiation and termination of processes;
    beginning and ending of threads; and
    synchronization of threads over a socket.

13. The method of claim 10, wherein the micro-tests are any of:
    memory allocation through Virtalloc;
    allocation and reading of memory; and
    allocation and writing to memory.

14. The method of claim 10, wherein the micro-tests are any random and sequential reading from a file;
    launching MICROSOFT EXCEL™ with a different file;
    creation of embedded directories and their bypass; and
    writing into a mapped file.

15. The method of claim 10, wherein the micro-tests are any copying of data between two memory areas;
    dividing by zero;
    operations with a registry;
    message exchanges between processes;
    sequential and page-by-page writes into a file; and
    rectangle rendering.

* * * * *